United States Patent [19]
Suter et al.

[11] Patent Number: 5,831,883
[45] Date of Patent: Nov. 3, 1998

[54] LOW ENERGY CONSUMPTION, HIGH PERFORMANCE FAST FOURIER TRANSFORM

[75] Inventors: Bruce Suter, Fairborn, Ohio; Kenneth Stevens, Hillsboro, Oreg.

[73] Assignee: United States of America as represented by the Secretary of the Air Force, Washington, D.C.

[21] Appl. No.: 863,239

[22] Filed: May 27, 1997

[51] Int. Cl.$^6$ .................................................. G06F 15/00
[52] U.S. Cl. ........................................................ 364/726.02
[58] Field of Search ........................ 364/725.01, 725.02, 364/706.01, 726.02, 726.03, 726.04, 726.05, 726.06, 726.07

[56] References Cited

U.S. PATENT DOCUMENTS

| | | | |
|---|---|---|---|
| 4,106,103 | 8/1978 | Perreault | 364/726.03 X |
| 4,547,862 | 10/1985 | McIver et al. | 364/726 |
| 4,768,159 | 8/1988 | Gray et al. | 364/726.03 |
| 4,970,674 | 11/1990 | Waite | 364/726.02 |
| 5,224,063 | 6/1993 | Matsunaga | 364/726.02 |
| 5,233,551 | 8/1993 | White | 364/726 |
| 5,313,413 | 5/1994 | Bhatia et al. | 364/726 |

*Primary Examiner*—Chuong Dinh Ngo
*Attorney, Agent, or Firm*—Gina S. Tollefson; Gerald B. Hollins; Thomas L. Kundert

[57] ABSTRACT

A practical, low-energy consumption method of performing an N-point fast Fourier transform employing mathematically justified manipulation of input data, multirate, parallel and asynchronous circuit techniques. The multirate feature allows an input data sequence to be broken down into its polyphase components. The polyphase components can then be operated upon in a local and parallel manner. Localizing and minimizing loads of a circuit allows operations to be performed only when necessary in an asynchronous manner. The energy consumed in performing an N-point fast Fourier transform of the present invention is less than half that of known systems employing global memory and clocked methodologies. The feature of low energy consumption makes the invention attractive for use in hand-held audio/video devices where energy requirements can be met with a low rate of battery replacement.

18 Claims, 7 Drawing Sheets

Fig. 2

$$X_i(n) = RX_i(n) + jIX_i(n)$$

$$\begin{bmatrix} X_0(0) \\ X_0(2) \\ X_0(1) \\ X_0(3) \end{bmatrix} = \overbrace{\begin{bmatrix} 1 & 1 & 1 & 1 \\ 1 & 1 & -1 & -1 \\ 1 & -1 & j & -j \\ 1 & -1 & -j & j \end{bmatrix}}^{221} \overbrace{\begin{bmatrix} Rx_0 + jIx_0 \\ Rx_2 + jIx_2 \\ Rx_1 + jIx_1 \\ Rx_3 + jIx_3 \end{bmatrix}}^{222} \Bigg\} 220$$

$$\left.\begin{aligned} X_0(0) &= Rx_0 + Rx_2 + Rx_1 + Rx_3 + j(Ix_0 + Ix_2 + Ix_1 + Ix_3) \\ X_0(2) &= Rx_0 + Rx_2 - Rx_1 - Rx_3 + j(Ix_0 + Ix_2 - Ix_1 - Ix_3) \\ X_0(1) &= Rx_0 - Rx_2 - Ix_1 + Ix_3 + j(Ix_0 - Ix_2 + Rx_1 - Rx_3) \\ X_0(3) &= Rx_0 - Rx_2 + Ix_1 - Ix_3 + j(Ix_0 - Ix_2 - Rx_1 + Rx_3) \end{aligned}\right\} 210$$

Let $a = x_0 + x_2$, $b = x_1 + x_3$, $c = x_0 - x_2$, $d = x_1 - x_3 \qquad \leftarrow 224$ $$\begin{bmatrix} X_0(0) \\ X_0(2) \\ X_0(1) \\ X_0(3) \end{bmatrix} = \begin{bmatrix} (a_R + b_R) + j(a_I + b_I) \\ (a_R - b_R) + j(a_I - b_I) \\ (c_R - d_I) + j(c_I + d_R) \\ (c_R + d_I) + j(c_I - d_R) \end{bmatrix} \Bigg\} 230$$

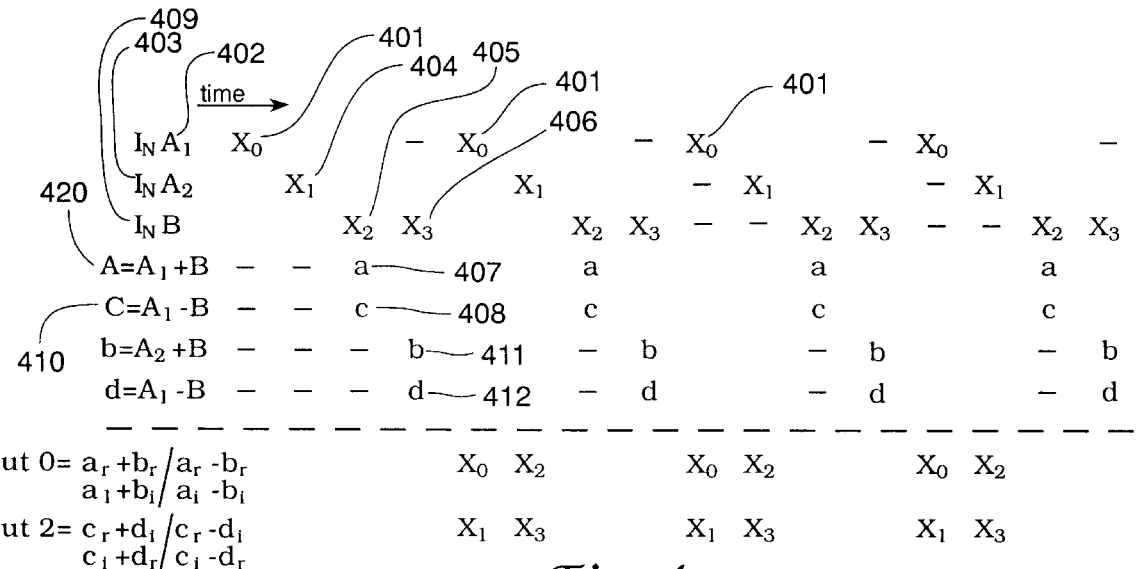

Fig. 4

LOW ENERGY CONSUMPTION, HIGH PERFORMANCE FAST FOURIER TRANSFORM

RIGHTS OF THE GOVERNMENT

The invention described herein may be manufactured and used by or for the Government of the United States for all governmental purposes without the payment of any royalty.

BACKGROUND OF THE INVENTION

A transform is an alternative technique that can be applied to solve a problem. Conventional techniques apply mathematics directly to the problem, whereas a transform will convert (or transform) the problem into another form that is sometimes simpler to calculate. The results of the transform calculation will then require another conversion to return the problem back to the original format. Many times the conversion can use constants or a lookup table, which can greatly simplify the problem. This is the case with the Fourier transform.

The Fourier transform is a principal analytical tool in many diverse fields, including linear systems, optics, probability theory, quantum physics, antennas, radar, and signal analysis. This transform can be expressed in terms of a discrete solution, called the discrete Fourier transform. The complexity of computing the discrete Fourier transform is often stated in terms of $N^2$, the square of the number of sample points examined. The discrete Fourier transform has found relatively few applications due to its complexity, even given the tremendous computational power and memory of modern processors. Many facets of the analysis of the aforementioned systems have been revolutionized with the development of a computationally simplified version of the discrete Fourier transform called the fast Fourier transform. This algorithm reduces the computational complexity to N log N.

The basic Fourier transform operation when applied to a waveform can decompose a complex waveform into a set of simple sinusoidal waveforms whose sum recreates the initial waveform. The simple waveforms have a representation as an amplitude and frequency. Mathematically, this can be represented as:

$$S(f) = \int_{-\infty}^{\infty} s(t)e^{-j2\pi ft} dt \qquad \text{Eq. 1}$$

where s(t) is the waveform to be decomposed into a sum of sinusoid waveforms, S(f) is the Fourier transform, and $$S(f_k) = \sum_{i=0}^{N-1} s(t_i)e^{-j2\pi f_k t_i} \quad k = 0, 1, \ldots, N-1 \qquad \text{Eq. 2}$$

If the waveform is not periodic, then the Fourier transform will be a continuous function of frequency. When this happens, the waveform s(t) is represented by the summation of sinusoids of all frequencies. In this case, the Fourier Transform becomes a frequency domain representation of the function. This allows the Fourier transform to analyze a problem from a different point of view. Thus, the Fourier transform and its inverse converts a signal between frequency and time domains.

One can apply numerical integration to Eq. 1 to create a problem that is more amenable to implementation on a digital computer as a trapezoidal formula since $s(t_r)=s(t_n)$:

$$j = \sqrt{-1}.$$

Typically, one will analyze a problem where there are N data points of the function $s(t_i)$, which we have assumed to be represented by no more than N different sinusoids. Looking at the equation reveals a complexity of $N^2$, where each operation requires a multiplication. Thus, we can approximate the continuous Fourier Transform using a discrete representation of the transform. Let $t_r = n\delta t$ and $f_k = k\delta f$. But $$T = \frac{1}{\delta f} = N\delta t.$$

We can then represent the discrete Fourier transform as the following equation:

$$S(k) = \Sigma s(n) e^{-j\frac{2\pi nk}{N}} \qquad \text{Eq. 3}$$

The fast Fourier transforms are based on the discrete Fourier transforms of Eq. 3. The algorithms are fast because they reuse the same roots of unity many times and thus minimize the number of multiplications. This reuse of the roots of unity reduces the complexity of the operation to N log N. Typical fast Fourier transform algorithms achieve the decrease in complexity over the discrete Fourier transform algorithm by using these roots of unity and storing the intermediate values in global memory. The stored values are retrieved rather than explicitly using a multiplication to calculate them. Unfortunately, such algorithms do not work well for low energy consumption implementations due to the global nature of the shared memory required for storage and lookup of the intermediate results. Current technology employs two approaches for architecting fast Fourier transforms for high performance or low energy consumption. A complex switching network, called a butterfly network, is employed to forward results between parallel functional units in a pipelined manner. The primary obstacle to low energy consumption and higher performance is the global memory these networked architectures use to store and forward intermediate results. Global memories are notoriously slow and heavily loaded due to their shared nature. Global wires, busses, and shared structures are the worst architectural features that can be included in a low energy consumption architecture. Additionally, a global clock is used which is continuously running and sequences the timing of operations in the circuit, regardless of whether an operation needs to be performed. In the architecture of the present invention, the global memory has been eliminated and is replaced by localize data sharing and forwarding amongst a small number of components. The global clock is also eliminated and is replaced by asynchronous or self-timed circuit methodology which allows operations to be performed only as needed, rather than dependent on a clock.

SUMMARY OF THE INVENTION

The present invention is a practical, low-energy consumption method of performing an N-point fast Fourier transform employing multirate, parallel and asynchronous circuit design techniques. The multirate feature allows an input data sequence to be broken down into its polyphase components. The polyphase components can then be operated in a very local and parallel manner. Localizing and minimizing loads of a circuit allows operations to be performed only when necessary in an asynchronous manner. The energy consumed in performing an N-point fast Fourier transform using the method and apparatus of the present invention is less than half that of known systems employing global memory and clocked methodologies. The feature of low energy consumption makes the present invention attractive for use in hand-held audio/video devices where energy requirements can be met without a high rate of battery replacement.

It is therefore an object of the invention to provide a low energy consumption, high performance fast Fourier transform architecture.

It is another object of the invention to provide a fast Fourier transform implementation using asynchronous methodologies.

It is another object of the invention to provide a fast Fourier transform implementation using multirate techniques.

It is another object of the invention to provide a fast Fourier transform implementation using parallelization techniques.

It is another object of the invention to provide a fast Fourier transform architecture that is free of global memory.

It is another object of the invention to provide a fast Fourier transform architecture that is free of a global clock.

These and other objects of the invention are achieved by a low energy consumption electronic circuit-based method of performing an N-point fast Fourier transformation comprising the steps of:

electronically sampling discrete data points consecutively in time from an input signal waveform and assigning each of said data points successively to $N_2$ number of parallel data tracks, each successive data track receiving a delayed sample of input signal data relative to the previous track, said assigning being repeated to said data tracks until all input signal data points are assigned;

said sampling step achieving a first data sequence downward frequency scaling of said input signal waveform data points by a factor of $1/N_2$, and providing $N_2$ number of reduced frequency second data sequences containing every $N_2$th data point from said input signal waveform;

electronically performing an $N_1$-point first fast Fourier transform operation on each of said $N_2$ number of reduced frequency second data sequences, numbers $N_1$, $N_2$ and N being related by the expression $N_1N_2=N$;

shifting phase of output of said performing step through a multiplication operation;

output from said shifting step defining $N_1$ rows of Fourier transformed first data sequences and correspondingly located data points from each of said $N_1$ rows of Fourier transformed first data sequences defining $N_2$ number of columns defining $N_2$ number of Fourier transformed second data sequences;

electronically accomplishing an $N_2$-point second fast Fourier transformation on each column of said second data sequences defined by said $N_2$ number of columns;

electronically recombining $N_1$ number of second Fourier transformed second data sequences from said accomplishing step into a single output data sequence representing an output data sequence of an N-point fast Fourier transformation operation on said input signal waveform, said recombining also achieving an upward frequency scaling of each $N_1$ number of output data sequences from said accomplishing step by a factor of $N_1$, a resulting frequency being also equivalent to the frequency of said discrete input sequence waveform; and controlling said sampling, performing, shifting, accomplishing and recombining steps by a minimal number of state transitions of a finite state machine, said N-point fast Fourier transform being achieved with lower electronic computational circuitry energy dissipation than required in performing a direct N-point fast Fourier transformation on said input sequence waveform.

Additional objects and features of the invention will be understood from the following description and claims and the accompanying drawings.

BRIEF DESCRIPTION OF THE DRAWINGS

FIG. 2 shows the mathematical derivation for a 4-point fast Fourier transform.

FIG. 4 illustrates a categorization of arrival of results and processing in time and space for a 4-point fast Fourier transform.

DETAILED DESCRIPTION

Figure 1:
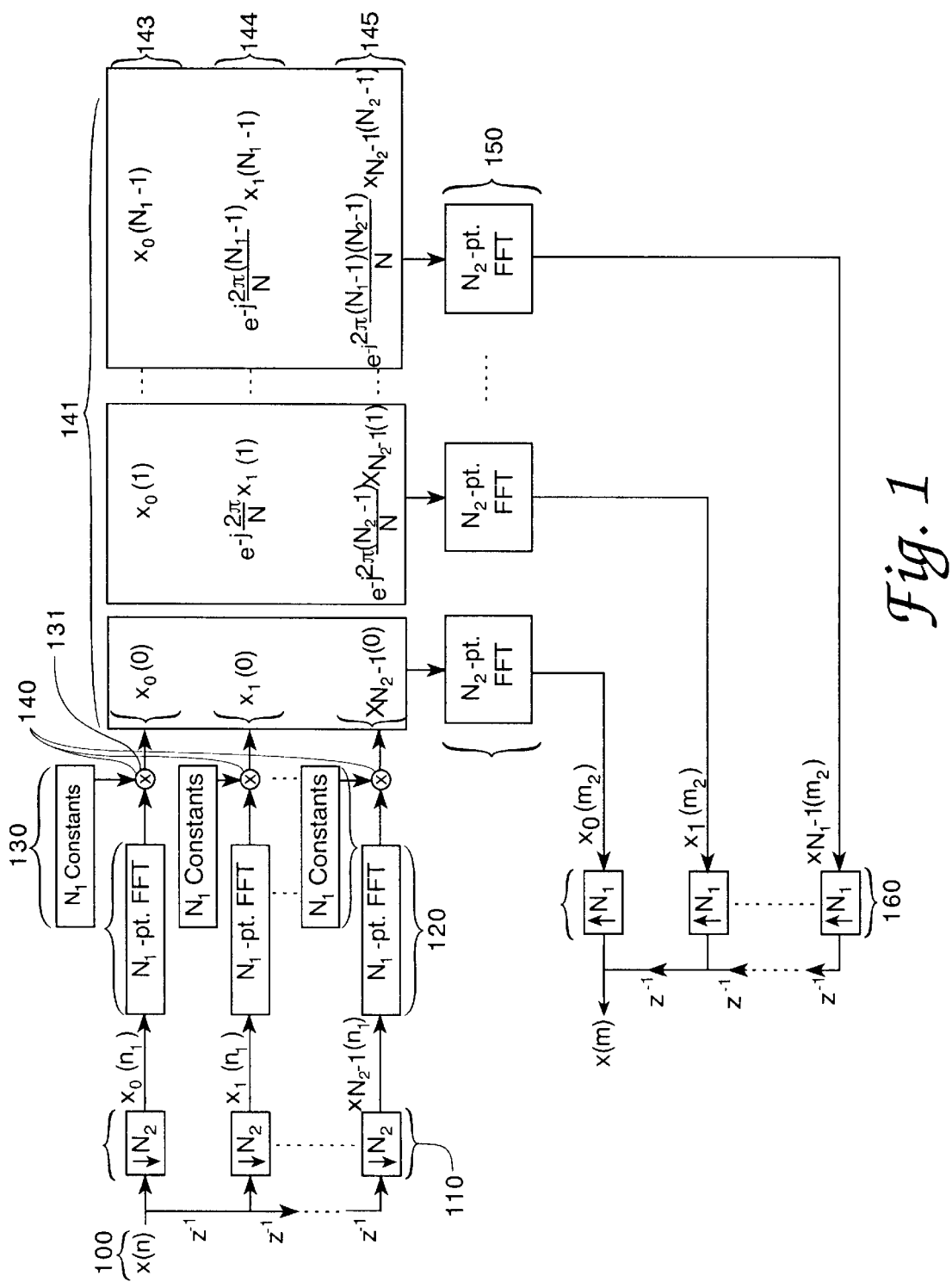
FIG. 1 shows a block diagram of a fast Fourier transform implementation of the present invention.

The present invention provides a fast Fourier transform implementation that is optimized for low energy consumption with a goal of 10× to 100× reduction in energy consumption at constant performance. The present invention processes an N-point: fast Fourier transform breaking it down into lower level fast Fourier transforms which are simpler to compute, made possible by the availability of state-of-the-art high density circuits not previously available. High density circuits permit the use of parallelism which is employed in the present invention and allows, along with multirate techniques, the implementation of asynchronous methodology. All of these features operate in combination to achieve the low energy consuming method of the present invention. The present invention is ideal for use in hand-held audio/video devices because the energy from the batteries is consumed at a much slower rate than in other integrated circuit fast Fourier transform implementation systems, thereby minimizing battery replacement and cost.

To illustrate the energy saving features of the present invention, first assume a low energy consumption circuit technology such as CMOS where energy is actively dissipated only when a node of the circuit is switched. The present invention is presented in terms of how energy is expended in CMOS processes, which helps illustrate architectural decisions that minimize energy consumption. The total energy dissipation, E, of such circuits can be attributed to three factors as shown in the following equation:

$$E = E_{cap} + E_{short} + E_{sub} \qquad \text{Eq. 4}$$

$E_{cap}$ is the energy required to dynamically charge and discharge capacitors, $E_{sub}$ is the leakage currents dissipated by the devices in the subthreshold regions of operation, and $E_{short}$ is the short-circuit energy when there is a conducting path between power and ground. The subthreshold (leakage) current in CMOS processes is to first order effects determined by fabrication process parameters. Although leakage currents across transistor gates can be controlled in the exponential subthreshold range for certain analog devices that operate exclusively in the subthreshold regions, for digital circuits, leakage across the gate will always be less than $E_{short}$. The total leakage currents $E_{sub}$ from all sources in a digital CMOS integrated circuit are to a first order effect controlled by the process parameters and can be approximated by a constant. These currents are orders of magnitude less than $E_{cap}$ and $E_{short}$ in today's processes. As process voltage is reduced in future processes, leakage currents may increase, even to the point of dominating power on a CMOS integrated circuit chip. Since the leakage current is relatively constant across a wide range of digital designs and circuit styles it will not affect our low power design analysis even though it may play a large role on overall power consumption in future CMOS circuits.

The dynamic energy dissipation $E_{cap}$ occurs as nodes are charged to $V_{DD}$ and discharged to ground, when energy is not recuperated. This energy can nearly entirely be accounted for as the capacitive load which is a property of the interconnect and gates of CMOS circuits. Each node has capacitance that is proportional to the distance between the sending and receiving circuit elements, the number of receiving circuit elements, size of the receiving and driving circuit elements, and geometries of the process and wire proximities. Accordingly, the precise value of dynamic energy dissipation for any node can be extracted from the physical layout and process parameters. The dynamic energy dissipation to first order effects is shown in Eq. 5.

$$E_{cap} = \sum_i h_i C_i V_{DD}^2 \qquad \text{Eq. 5}$$

The term $h_i$ represents the number of times a particular node is charged or discharged, and $C_i$ is the capacitance of that node. Note that the supply voltage contributes a quadratic effect on the total energy dissipation whereas the load and number of transitions is linear. Also note that the dynamic power dissipation is independent of the speed of operation but directly proportional to the number of transitions. Hence, performing the calculation faster or slower has no overall effect. We can therefore assume that energy only needs to be dissipated when some computation, or change of state, is required of the system.

Short-circuit energy occurs in a static switching element, such as an inverter and the magnitude of the short circuit energy of a simple static inverter can easily be of the same order of magnitude as $E_{cap}$. The equation for $E_{short}$ of an inverter can be approximated to first order effects by $$E_{short} = (Q_T - V_{DD} C_L) V_{DD} \qquad \text{Eq. 6}$$

This equation can be combined with the energy associated with charging and discharging the capacitor to reach our total current estimation. When the input transients are very short, $Q_T \approx C_L V_{DD}$, the short circuit current tends toward zero. However, for very slow inputs, the load capacitance becomes unimportant and the current becomes totally dominated by short circuit current. With small thresholds, the current is proportional to $V_D^2$, so the total energy dissipation $E \propto V_{DD}^3$ but can be minimized to $E \propto V_{DD}^2$ for heavily velocity saturated devices.

The short circuit energy scales from 0 to $V_{DD}^3$ based on the transition time of the input signals. Minimizing short circuit energy optimizes high-performance static logic circuits, since a minimal propagation delay also depends on a rapid transition of the input signal. Overall power dissipation of a single node is minimized when the rise and fall time of the inputs are minimized if the loads are constant, since the energy dissipation attributed to charging a load capacitor is independent of time. This implies that minimizing the capacitive load can be directly related to the short circuit load if a resultant decrease in transition times is observed.

The present invention is based on the above analysis and the conclusion that the primary means of architecting low power circuits is to reduce the dynamic energy, $E_{cap}$. Power is only dissipated when a node is charged or discharged; waiting does not dissipate power in this equation. Hence, the most energy efficient circuits are those that perform computations only when necessary and whose architecture is designed such that the loads are localized and minimized, eliminating the requirement for global memory sharing. The present invention provides an implementation of the fast Fourier transform which removes the requirement for any shared information in a fast Fourier transform calculation. This feature of the invention can be understood by considering the following equation for a fast Fourier transform from Eq. 3.

$$X(m) = \sum_{n=0}^{N-1} x(n) W_N^{nm} \qquad \text{Eq. 7}$$

where $$W_N = e^{-j \frac{2\pi}{N}} \qquad \text{Eq. 8}$$

We now assume that $N = N_1 N_2$. By the division theorem for integers, we can let $m = m_2 N_1 + m_1$ and $n = n_1 N_2 + n_2$ where $m_1$, $n_1 = 0, 1, \ldots, N_1 - 1$ and $m_2, n_2 = 0, 1, \ldots, N_2 - 1$. Given a sequence $x(n)$, then its polyphase components are defined as $x_k(n) = x(Mn + k)$, $k = 0, \ldots, M-1$. Now, we can break the fast Fourier transform computation up using this polyphase notation into interdependent equivalent classes of calculations by letting $X_{m_1}(m_2) = X(m_2 N_1 + m_1)$ and $x_{n_2}(n_1) = x(n_1 N_2 + n_2)$. Using this polyphase representation, we can represent our fast Fourier transform as $$X_{m_1}(m_2) = \sum_{n_2=0}^{N_2-1} \sum_{n_1=0}^{N_1-1} x_{n_2}(n_1) e^{-j \frac{2\pi (m_2 N_1 + m_1)(n_1 N_2 + n_2)}{N}} \qquad \text{Eq. 9}$$

or equivalently, $$X_{m_1}(m_2) = \sum_{n_2=0}^{N_2-1} \sum_{n_1=0}^{N_1-1} x_{n_2}(n_1) e^{-j \frac{2\pi m_2 N_1 n_1 N_2}{N}} e^{-j \frac{2\pi m_2 N_1 n_2}{N}} e^{-j \frac{2\pi m_1 n_1 N_2}{N}} e^{-j \frac{2\pi m_1 n_2}{N}} \qquad \text{Eq. 10}$$

Since the first exponential term is equal to unity, we can simplify as:

$$X_{m_1}(m_2) = \sum_{n_2=0}^{N_2-1} \sum_{n_1=0}^{N_1-1} x_{n_2}(n_1) e^{-j\frac{2\pi m_2 n_2}{N_2}} e^{-j\frac{2\pi m_1 n_1}{N_1}} e^{-j\frac{2\pi m_1 n_2}{N}} \quad \text{Eq. 11}$$

or simply, $$X_{m_1}(m_2) = \sum_{n_2=0}^{N_2-1} \left[ e^{-j\frac{2\pi m_1 n_2}{N}} \sum_{n_1=0}^{N_1-1} x_{n_2}(n_1) e^{-j\frac{2\pi m_1 n_1}{N_1}} \right] e^{-j\frac{2\pi m_2 n_2}{N_2}} \quad \text{Eq. 12}$$

Using the $W_n$ notation we can express our final form as $$X_{m_1}(m_2) = \sum_{n_2=0}^{N_s-1} \left[ W_N^{m_1 n_2} \sum_{n_1=0}^{N_1-1} x_{n_2}(n_1) W_{N_1}^{m_1 n_1} \right] W_{N_2}^{m_2 n_2} \quad \text{Eq. 13}$$

This represents $N_2$ fast Fourier transforms using $N_1$ values as the inner summation, which are scaled and then used to produce $N_1$ fast Fourier transforms of $N_2$ values. The total operation achieves the desired fast Fourier transform size N.

Breaking the N-point fast Fourier transform down into $N_1$-point fast Fourier transforms of $N_2$ data points and then $N_2$-point fast Fourier transforms of $N_1$ data points permits the computation of lower point fast Fourier transforms. Lower point fast Fourier transforms requires simpler computations and consumes less energy than higher point fast Fourier transforms and the output represents the desired output of an N-point fast Fourier transform performed or accomplished on the discrete input sequence waveform. FIG. 1 shows an N-point fast Fourier transform broken down into lower level $N_1$-point and $N_2$-point fast Fourier transforms at 120 and 150, respectively. To illustrate the simplicity of performing a low-point fast Fourier transform, the mathematical derivation for a 4-point fast Fourier transform is illustrated in FIG. 2. Simple matrix factoring and row interchanging is applied to the discrete Fourier transform of Eq. 13 to arrive at the form in FIG. 2. The equations at 210 for $X_0(0)$, $X_0(1)$, $X_0(2)$ and $X_0(3)$ are obtained by multiplying the fast Fourier transform matrix 221 by the input matrix 222. Allowing $a=x_0+x_2$, $b=x_1+x_3$, $c=x_0-x_2$ and $d=x_1-x_3$, as shown at 224 in FIG. 2, where a, b, c and d are complex variables allows the grouping of the equations at 210 resulting in the simplified equations at 230. The 4-point fast Fourier transform of FIG. 2 only requires that we multiply the input vector by matrix elements of plus or minus unity or j shown at 221. Note that multiplying by j is never actually needed, j is just the root that creates a complex number. Therefore, the 4-point fast Fourier transform can be completed without any multiplications. The final matrix at 230 has simplified the problem and represented it in terms of the additions and subtractions that need to be calculated. The simplicity of performing or accomplishing this 4-point fast Fourier transform illustrates that the degree of complexity of the calculation is at the level of addition and subtraction and accordingly, use of global memory is not required.

In addition to decreasing the complexity of calculations required in obtaining the output of an N-point fast Fourier transform, a method of computing only when necessary is employed in the invention to reduce energy consumption. The method of computing only when necessary as used in the present invention is referred to herein as asynchronous methodology because it is in direct contrast to known systems that operate on a clock sequence, or in other words, systems that compute synchronously based on clocked timing. Asynchronous methodology produces reactive systems where transitions only occur in response to a change of state in the computation and involves localized control with well-defined interfaces rather than the arrangement where transitions occur due to a globally synchronizing signal. This is not the case in clocked methodologies where significant power is expended at the clock frequency independent of the function or state of a calculation. Further aggravating energy consumption issues attending use of a clock is its global nature. The clock and associated circuitry consume 40–60% of the power in today's CMOS circuits.

Since asynchronous circuits perform calculations only when necessary, the throughput rate is determined by average case delay. If a multiplication, for example, only requires five cycles for a given set of inputs, then it can be performed in five cycles using an asynchronous circuit rather than the larger number of cycles which could be imposed in a clocked multiplication. Other input sets may require greater or fewer cycles. Hence, asynchronous methodology has both performance as well as power dissipation advantages. One can also use algorithm and data analysis to generate probability distributions to optimize the circuits for load and the number of state changes to perform calculations. For example, suppose a five input OR operation is required where one input, signal a, has an activity probability of 90%. Optimizing this circuit for power and performance will provide a two-input OR gate generating the output from signal a and the other four inputs OR'ed together.

Figure 3:
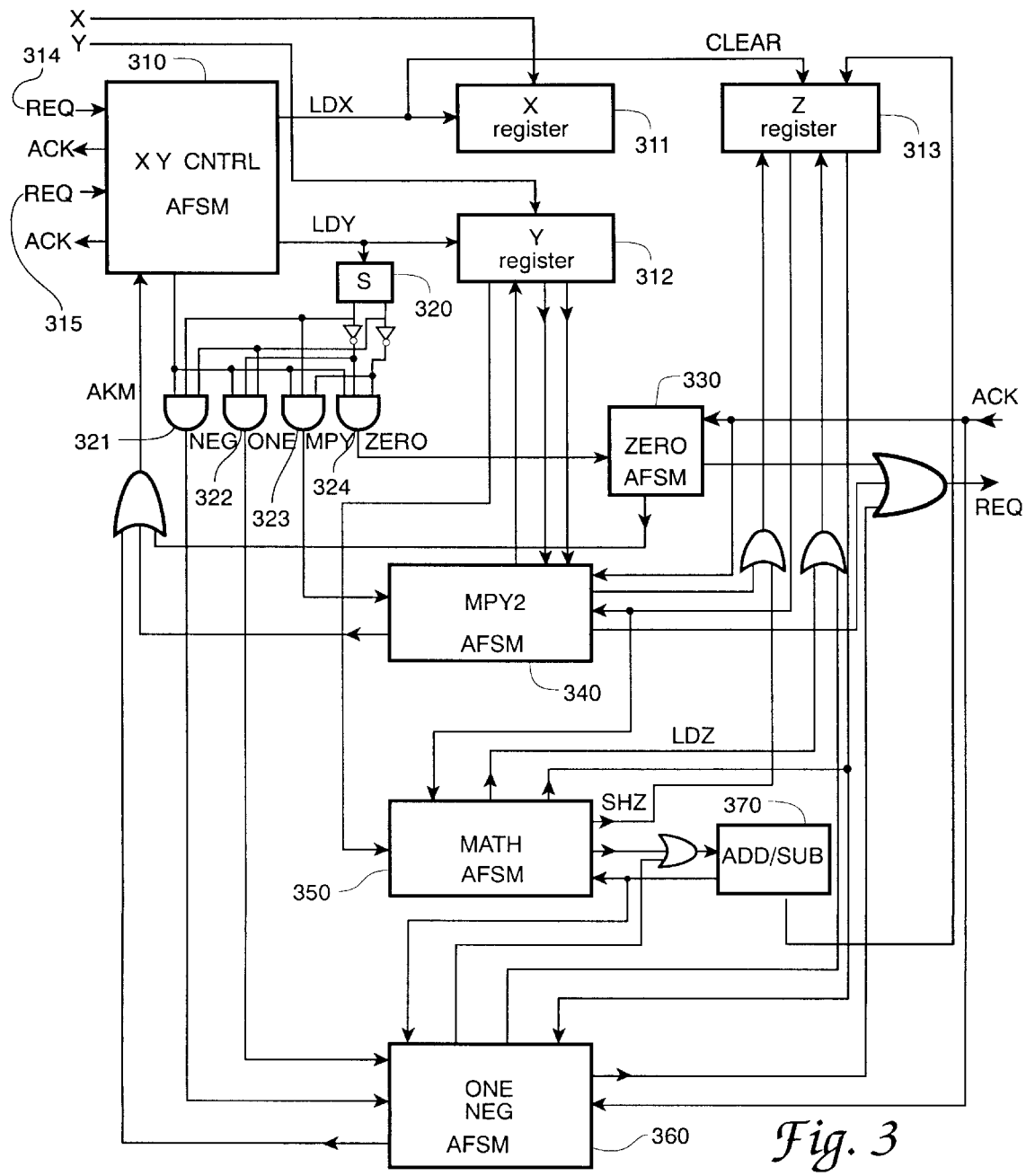
FIG. 3 shows a hardware diagram of a multiplier in accordance with the present invention.
Figure 6:
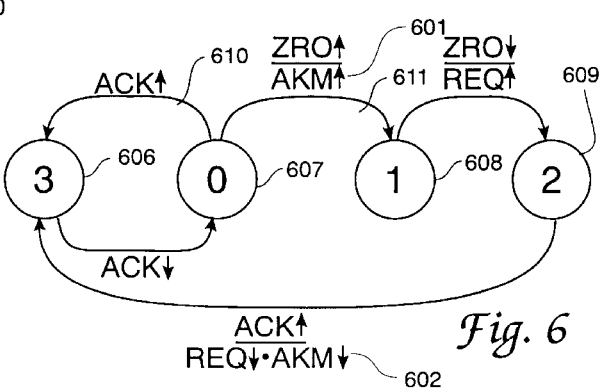
FIG. 6 shows a state diagram indicating state transitions of an asynchronous finite state machine usable with the present invention.

By way of further illustrating asynchronous methodology, consider FIG. 6 which is a state diagram depicting part of the control logic for the zero asynchronous finite state machine which may be used at 330 in the FIG. 3 multiplier. The state diagram of FIG. 6 consists of a set of states, a set of input labels, a set of output labels and a transition function that maps states to states based on input signals. The states are represented as circles 606, 607, 608 and 609 and the states have a unique numeric name placed at the center of each circle. The arcs between states at 610 and 611, for example, are labeled with conditions on which the transition occurs and outputs that are generated based on the transition. When multiple inputs are labeled on an arc, the transition does not occur until the conjunction of all transitions are satisfied. In FIG. 6, ZRO and ACK represent input signals and AKM and REQ represent output signals. For example, if you are at state 0 at 607 and you receive an ACK input then you transition to state 3 at 606. State 0 at 607 transitions to state 1 at 608 when ZRO is input and at the same time AKM at 601 is output. State 1 at 608 transitions to state 2 at 609 when ZRO is input and at the same time REQ is output. Similarly, state 2 at 609 transitions to state 3 at 606 when ACK is input and at the same time REQ and AKM is output. FIG. 6 illustrates the feature of asynchronous methodology that the states are responsive to inputs rather than an arbitrary clocked timing.

Figure 7A:
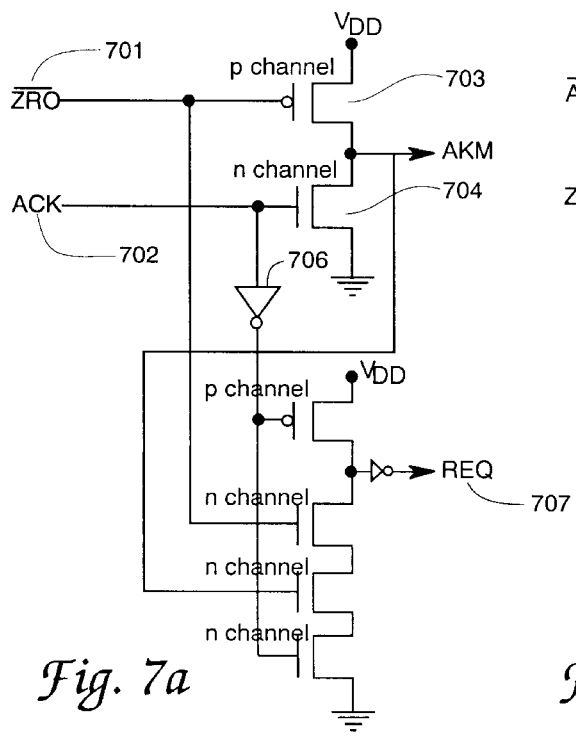
FIG. 7a shows a circuit diagram of an implementation of the FIG. 6 asynchronous finite state machine.
Figure 7B:
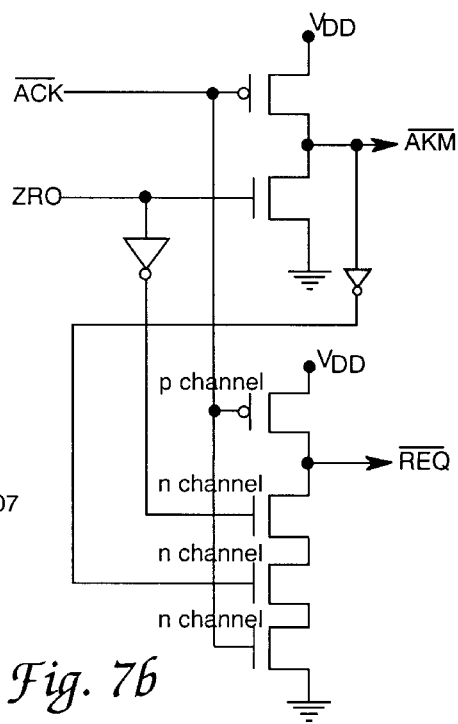
FIG. 7b shows a circuit diagram of an alternate implementation of the FIG. 6 asynchronous finite state machine.

FIGS. 7a and 7b show possible implementation circuitry of the state diagram of FIG. 6. The circuitry of FIG. 7a generates AKM in positive logic, whereas the circuit in FIG. 7b creates its complement. Both positive and negative logic circuits have been illustrated, however only one will be used in the multiplier circuit of FIG. 3 to minimize power and area. The choice between circuits of FIG. 7a and FIG. 7b is based on the logic levels of the AKM and REQ signals required by other blocks in the system, and the latency of the device. An asynchronous implementation of FIG. 6 is the smallest and fastest MOS implementation possible for the specified function since a single transistor 703, for example, can be used to set and reset the output value. Such a FIG. 7 circuit has a smaller power supply load than an inverter since each input at 701 and 702, for example, only drives a single transistor at 703 and 704, respectively which reduces the power consumption. Further, there is no $E_{short}$ (short circuit) current since the p-device at 703 and the n-device at 704 are never turned on at the same time. Therefore, this FIG. 7a and 7b device has lower power per transition than even a simple inverter. A single gate delay between input and output (which is the minimum latency for any logic function), and a single device between power and ground is also optimal, resulting in ability to create the fastest possible device with the highest gain.

Note that from the state diagram in FIG. 6 that the ZRO signal turns on the REQ activity. Hence, the ZRO signal 701 in FIG. 7 is closest to the output, resulting in at fast pulldown of REQ at 707 (one gate delay) in the FIG. 7a and pull up 7b embodiment. When ACK is not provided as an input, there will be no short circuit current in FIGS. 7a and 7b. Unfortunately, the FIG. 7a circuitry requires both the true and complement value of ACK to generate the complete result for use in the FIG. 3 multiplier, and the resetting of the REQ signal is thereby delayed through an inverter 706.

Looking at the FIG. 6 and FIGS. 7a and 7b circuitry as a whole, since both REQ and AKM are specified to be ORed with two other signals in the FIG. 3 multiplier circuitry, the most efficient implementation in terms of both performance and power is to OR the complement of these signals through a NAND gate. Therefore, the circuitry of FIG. 7b is more efficient in terms of both performance and power. Note that the delay throughout the extra inverter 706 on ACK is removed in circuit 7b, resulting in a reset response time that is half that of the circuit if FIG. 7a. The response time of all other transitions is comparable. Such asynchronous implementation techniques are applied to all circuits in this implementation. Asynchronous techniques result in significant power savings over synchronous design because there is no clock that needs to be added to enable signal transitions, and only necessary transitions occur. The techniques illustrated in this example result in significant power savings over even conventional asynchronous design techniques. These include using domino logic as opposed to on/off set implementations to eliminate $E_{short}$ and reduce the number of internal transitions necessary to create a function, and analyzing the behavior of the device to improve performance and power consumption either probabilistically or constantly as described in FIG. 7.

Although asynchronous techniques are not novel, low power asynchronous techniques, the subject of the present invention are believed novel and are a key architectural methodology for greatly reducing the energy of a computation when parallelism and multirate techniques are employed. Asynchronous techniques can reduce power up to 10× over comparable synchronous designs in CMOS circuits, and much more if asynchronous architectural features are employed. The synergy between an asynchronous operation and the parallelism introduced with this architecture are particularly apparent due to the differing speeds of calculations required to generate the overall fast Fourier transform. The asynchronous circuit correctly interfaces locally pipelined modules with the minimal number of state changes to synchronize processes operating at different speeds. This would not be achievable in known clocked circuits because the differing speeds of operations are irrelevant, all operations would be performed at the speed set forth by the clock.

Figure 5:
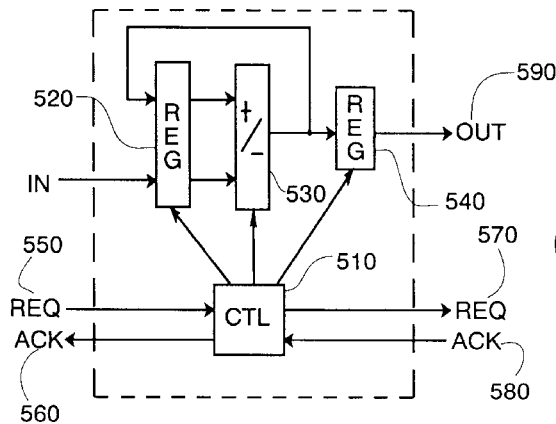
FIG. 5 shows a hardware implementation of a 4-point fast Fourier transform in block form.

A block diagram of an asynchronous circuit for a simple 4-point fast Fourier transform is shown at FIG. 5. The control logic hardware at block 510 operates by receiving requests to process inputs or requesting that outputs be processed, such requests shown in FIG. 5 at 550 and 570. As with asynchronous methodologies, such requests are acknowledged at 560 and 580. The request 550 indicates a new point in the fast Fourier transform has arrived to this block. The request 570 indicates that the next fast Fourier transform result has been created and the result is available for the next pipeline stage to the right. The acknowledge signals indicate that the data has been consumed. A request transition always precedes an acknowledge transition. This creates a formal handshake protocol that guarantees that both the producer and consumer are synchronized. The delays between request and acknowledge are arbitrary, which allows us to interconnect a circuit that can produce a result every 50 nanoseconds with a consumer that requires 600 nanoseconds between each data transfer. The requested data is then input to register 520 where it is latched or held until all requested data is received, then at such time the addition and subtraction operations for a 4-point fast Fourier transform are performed in block 530 using adders and subtractors. The data is then transferred to the register at block 540 where it is driven to the output OUT at 590 until ACK 580 is received.

FIG. 4 shows the sequencing of data and operations on data in time and space for the 4-point fast Fourier transform circuit of FIG. 5. Following the data from the left- to the right-hand side of the page shows the sequencing of data in time. The first three items in the column on the left side of FIG. 4 represent register locations in FIG 5. The REQ signal 550 in FIG. 5 indicates a new data item, initially x0, represented at 401 in FIG. 4, has arrived. This data is latched, or received, in the register location A1 of register 520 in FIG. 5 and represented at 402 in FIG. 4. Register locations A1 and A2 are arbitrary locations in register 520 in FIG. 5 used to illustrate the sequencing of data thereto. ACK 560 indicates that the data has been latched, and that the circuit is ready for another data item. The next REQ 550 will latch data x1 represented at 404 in FIG. 4 into register A2 represented at 403 in FIG. 4, and will be acknowledged by signal 560 in FIG. 5. On the third REQ 550, x2 shown at 405 in FIG. 4 is latched in register B represented at 409 in FIG. 4. Sufficient data has now arrived at this node to calculate part of the fast Fourier transform results. Four additions for the real and imaginary roots are calculated to create subresults a and c as shown at 407 and 408 in FIG. 4. Subresults a 407 and c 408 in FIG. 4 are derived from the equations set forth in line 224 of FIG. 2. Since this circuit is fast compared to a circuit including means for performing multiplication, only a single adder needs to be used and the results can be stored locally. The real and imaginary roots of a at 407 are calculated by adding the real/imaginary part of x0 represented at 401 with the real/imaginary part of x2 represented at 405 in FIG. 4 and further set forth in line 224 of FIG. 2. This takes two cycles through the adder/subtractor and the results are stored in register A represented at 402 in FIG. 4. The same occurs for C represented at 410 in FIG. 4, requiring a total of four additions. In FIG. 5, ACK 560 is asserted, and the new value x3 represented at 406 in FIG. 4 is latched when REQ 550 occurs. The subresults b and d represented at 411 and 412 in FIG. 4, respectively are calculated exactly like a and c at 407 and 408, requiring four additions and two more register locations. Although all information to generate the result of the 4-point fast Fourier transform is available based on receipt of data points $x_0$, $x_1$, $x_2$, and $x_3$ into register 520 in FIG. 5, the results are delayed. This allows the logic to remain balanced in time and simplify the control logic. Each cycle from here requires four additions and produces two results every two input cycles. Note that only six registers are required, but the control and data path logic can be simplified by using seven registers resulting in less power consumption.

As stated previously, the synergy of asynchronous methodology as well as parallelism is critical to the low energy consuming feature of the present invention. Through applying parallelism, one can benefit directly by lowering both the voltage and the capacitance load on the devices. Because the performance of the system as a whole is the sum of the components, each parallel operation can run slower which results in a savings of energy. In addition to parallelism, multirate techniques are implemented in the present invention to reduce the energy consumed by an integrated circuit. This approach is applied using a combination of delays and decimators which breaks input data sequence up into its polyphase components. These polyphase components are then operated on in a very local and parallel manner. The output polyphase components are input to a combination of expanders and delays to produce the fast Fourier transform of the N-point sequence. The parallelism of this technique is mathematically scalable without introducing error into the computation.

The present invention distributes the fast Fourier transform computation on a semiconductor chip in an efficient and localized manner. The parallelism and multirate features of the present invention are practically illustrated using a 256-point fast Fourier transform. A 256-point fast Fourier transform is easier to visualize and more regular than either a 1024-point or larger fast Fourier transform, although both sized fast Fourier transforms are possible to implement by the method and device of the present invention. FIG. 1 shows a block diagram of an implementation of the present invention. The 256-point fast Fourier transform implementation is broken up into the representative 16 smaller, lower-point fast Fourier transform blocks shown at 120 and 150 in FIG. 1. The entire top-level diagram represents a 256-point fast Fourier transform in this FIG. 1 example. Each of the $N_1$ blocks shown at 120 and the $N_2$ blocks shown at 150 represent another fast Fourier transform operation, where each can also be broken up using the same concept or structure as in FIG. 1 since the described fast Fourier transform realization is hierarchical, except where the values of $N_1$ have changed. Accordingly, it is possible, using techniques of the present invention, to achieve a 4-point fast Fourier transform in both blocks 120 and 150 of the present invention. At the top level we are implementing the 256-point fast Fourier transform by a 16×16-point fast Fourier transform structure. Here, $N_1$ and $N_2$ are each equal to 16. The second level of the hierarchy at 150 in FIG. 1 implements the 16-point fast Fourier transform as a 4×4-point fast Fourier transform, where $N_1$ and $N_2$ at this level are both four. The top level can be again broken down using techniques of the present invention from a 16-point to a 4-point fast Fourier transform. A 256-point fast Fourier transform was chosen because it allows $N_1$ and $N_2$ to be the same at each level in the hierarchy. If a different size fast Fourier transform were chosen, such as a 1024-point, the values for $N_1$ and $N_2$ will also differ at one or more hierarchy levels. One can still utilize the same blocks as disclosed herein, but the hierarchy would be slightly different.

Figure 8:
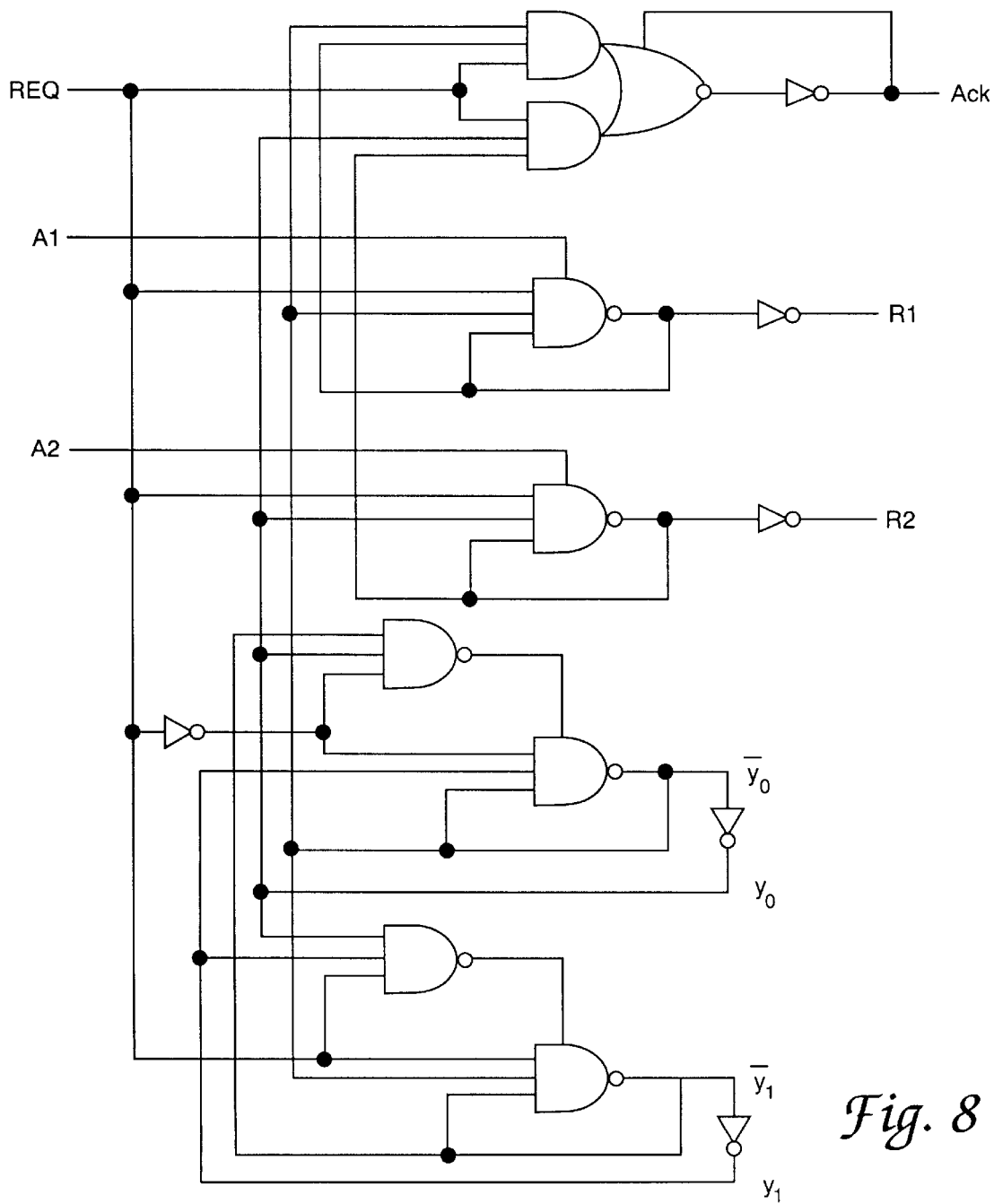
FIG. 8 shows a 2:1 decimator arrangement.
Figure 9:
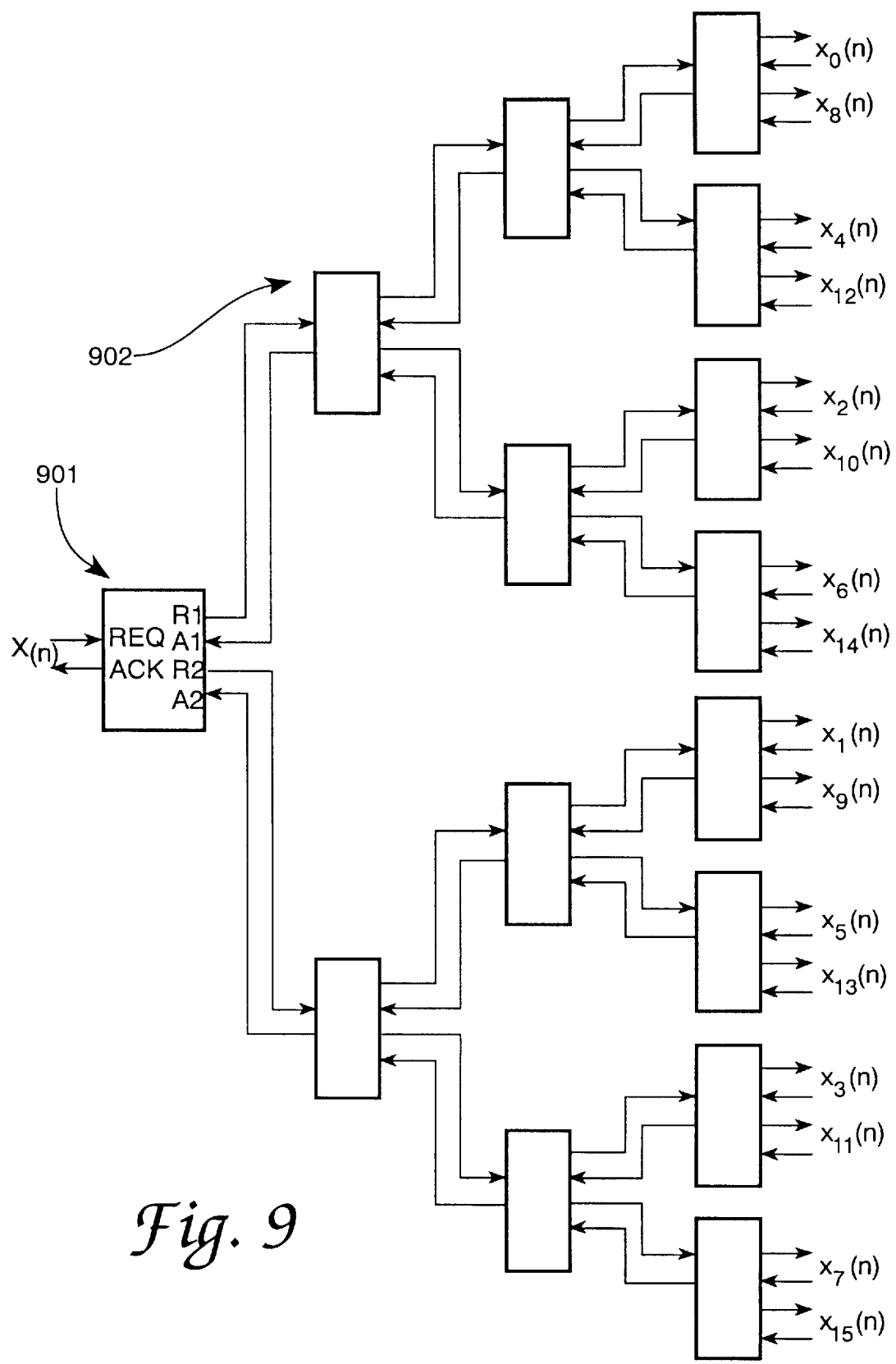
FIG. 9 shows a 2:1 decimator cell in a logarithmic tree arrangement.

The down arrow blocks at 110 are called decimators. A decimator, also known as a downsampler, is a common device used in multirate signal processing that changes the sampling rate of the input signal. More precisely, if M is a positive integer and x(n) is an input signal, an M-fold decimator applied to an input signal x(n) retains only those samples of the input signal that occur at M time multiples apart. For a sampled signal x(n), the output of the decimator is given by y(n)=x(Mn). Such a decimator is represented in FIG. 8. In the arrangement of the present invention in FIG. 1 there are $N_2$-fold decimators. The function of these $N_2$ number of decimators at 110 is to sample the sequence input at 100 periodically. The samples are made in a regular, repeating manner where the first sample is taken by the first decimator, the second by the second and so on. After the last decimator has taken its sample, the first decimator then takes its second sample. This second sample is segregated from the first sample in the decimator by being assigned to a different sequence of input data. Therefore, the waveform to each FIG. 1 horizontal track 102, 104 and 106 is comprised of a frequency $1/N_2$ times the frequency of the input waveform. This allows us to process each waveform independently at $1/16$ the rate of the initial waveform (where $N_2$=16). Given the hierarchical nature of the fast Fourier transform implementation of FIG. 1, each horizontal track also consists of decimators on the input, where decimation is done by a factor of four. The actual frequency of the fast Fourier transform operation is therefore done at a rate of $1/16 \times 1/4$, or $1/64$ of the rate of the initial 256-point sample sequence rate. The number we will use in this example is a sampling rate of 10 ns on the initial waveform. The decimation allows each sample to arrive at the internal fast Fourier transforms at a rate of 1 sample per 640 ns. This allows ample time to carry out the required operations and optimize the fast Fourier transform implementation of FIG. 1 for low energy consumption. Implementation involves a single 1:2 decimator cell that can be connected in a logarithmic tree pattern to implement any size decimator. Such an arrangement is represented in FIG. 9 where 901 and 902 represent decimator cells contained throughout the tree arrangement. A logarithmic tree decimator network is used as a tradeoff between complexity and delay, and the speed at which the circuits must run to map the very high speed external waveform interface to the slower internal speed due to decimation. A 2-way decimator is a simple circuit that can be designed to run at ultra high frequency, whereas a more complex decimator, such as a 16-way decimator could not keep up at that frequency. The logarithmic scaling of the decimator tree allows our 16-way decimation to require only 4 stages of simple 2-way decimators.

A simple, asynchronous finite state machine is used for control of the FIG. 1 processing, and the wires of this machine serve very well for dynamic data storage in a dynamic shift-register like mechanism. The dynamic shift-register like mechanism utilizing the wires as capacitance storage elements operates by charging or discharging the voltage on the wire embodied storage nodes according to the value of the input waveform. If the data does not change from one sample to the next, then the storage node is merely refreshed, at little or no power expense. When data on a particular line changes, the new value is driven onto the dynamic storage node. The continuous frequency of the wave sampling at 110 allows the capacitor, and hence energy, required to store the waveform sample to be very small.

The next logical block in the block diagram of FIG. 1 is the $N_1$-point fast Fourier transform block 120. This is where the hierarchical structure of the design occurs. Since the present invention processes an N-point fast Fourier transform, we can utilize the same techniques to achieve additional concurrency and lower frequency. In the top level 120 each fast Fourier transform block involves a 16-point fast Fourier transform, which is then broken into a 4-point fast Fourier transform after a 4-way decimation in the lower level of the hierarchy at 150. As shown previously in FIG. 2, an efficient implementation of a 4-point fast Fourier transform can be calculated with only addition, and does not require any multiplication. Decimating the design to 4-point and smaller, addition-based fast Fourier transforms are advantageous because multiplication is a significantly more complex operation than addition. Multiplication dissipates on average an estimated 18 times more energy than addition in calculating a 4-point fast Fourier transform. Actually, eight additions and eight subtractions are required over four sampling periods to calculate the 4-point fast Fourier transform. A simple asynchronous finite state machine coordinates the control aspects of storing the inputs, routing values to the adder, and results to the output using standard asynchronous protocols in performing the 4-point fast Fourier transform as discussed previously relating to FIGS. 4 and 5.

The $N_1$-point fast Fourier transform block at 120 in FIG. 1 is one of the two main functional blocks of the invention. Each block 120 has been partitioned into plural 4-point fast Fourier transforms such that the calculation carried out locally can be very efficient and low energy. No multiplications are needed at this 4-point fast Fourier transform level, and the data storage and sharing is minimal. This is a significant aspect of the present invention. If inputs are transmitted and received skewed in the order shown in FIG. 4, such that the first, third, second, then first item arrive at a node, then only eight input data storage registers are required in the fast Fourier transform circuitry. A very low energy adder/subtractor implementation is thereby further fabricated and completion time varies from 20 ns to 30 ns dependent on the data in a 2.0 micron CMOS process. The $N_1$-point fast Fourier transform block of FIG. 120 in FIG. 1 therefore has a frequency reduced decimated representation of selected data points from the input sequence waveform at 100 as its input signal and a stream of decimated fast Fourier transform coefficient data as its output. The fast Fourier transform computations to relate these input and output data streams are accomplished according to Eq. 13 and FIG. 1 and in a manner which is otherwise known in the fast Fourier transform art.

Each product block 140 of FIG. 1 multiplies a stream of results coming from the $N_1$-point fast Fourier transform units 120 by a set of constant values 130. The set of constant values are indicated by $$e^{-j\frac{2\pi m_1 m_2}{N}} \quad \text{Eq. 14}$$

where $m_1=0, \ldots, N_1-1$ and $m_2=0, \ldots, N_2-1$. The requirement of multiplying the output of the $N_1$-point fast Fourier transforms can be understood mathematically by referring back to Equations 12 and 13. Many times the constant is unity, so the fast Fourier transform result can simply be passed through the product block 140. All the constants at 130 in the top product block 131 are unity, so this block does not contain a multiplier. Every other Product block has at least one unity constant per set of $N_1$ constants. The asynchronous protocol will forward the fast Fourier transform results with a handshaking protocol under control of an asynchronous finite state machine. The effect of multiplying a stream of results coming from the $N_1$-point fast Fourier transform by Eq. 14 is to shift the phase of the $N_1$-point fast Fourier transform output. Shifting the phase prepares the stream of results for further processing in the FIG. 1 arrangement of the present invention.

The complex number multiplications at 140 require four multiplications of the real and imaginary roots plus one addition and subtraction to create the complex valued result. The blocks 140 must therefore do a complex multiply every cycle—or every 640 ns. This requires one multiply every 160 ns. A multiplier using a radix-2 Booth encoding may be used, but a radix-3 encoding can also be used and may be more power-efficient. A power-efficient radix-2 implementation could easily multiply in 310 ns, requiring two multipliers per product block 140. The multiplier may be compact and consist of an adder/subtracter, two registers, one shift register, a controller and several asynchronous finite state machines.

A block diagram of such a multiplier is included in FIG. 3. In FIG. 3 the XY Control asynchronous finite state machine 310 interfaces between the two REQ input sources represented at 314 and 315 and the FIG. 3 multiply unit. When the multiplier is idle, it will latch the multiplier Y 312 and the multiplicand X 311 values, and then start the multiplication. If the multiplier is idle, the values are immediately latched, but if the multiplier is busy, the data is not latched until the X and Y registers 311 and 312 are free. The handshaking protocol guarantees correct operation for all delays and interleavings. The FIG. 3 multiplier has been optimized to rapidly forward results when the multiplier argument Y is equal to zero, one or negative one. This is relatively common occurence in a fast Fourier transform calculation, and the asynchronous protocols can take advantage of the power savings and decreased delay. The S block at 320 is a two-bit register that determines whether the operation is a one represented at 322, a zero represented at 324, or negative one represented at 321 and the case where a full multiply, or MPY represented at 323 is required. These values are mutually exclusive, and four different asynchronous finite state machines 330, 340, 350 and 360 handle the control conditions for these cases.

The ZERO asynchronous finite state machine 330 propagates a value of zero as the result. The implementation of this block was discussed previously and shown in FIGS. 6 and 7. The ONE-NEG asynchronous finite state machine 360 forwards the multiplicand or its complement. The MPY2 asynchronous finite state machine 340 and MATH asynchronous finite state machine 350 coordinate to calculate a radix-2 encoded booth multiplication, which can be accomplished with adds, shifts and subtracts at 370. The value of the multiplier Y is used to determine the Booth encoding, and must be observed by the MPY2 asynchronous finite state machine. The results are accumulated in the Z register 313, which also incorporates a sifting capability when no add or subtract is necessary. For purposes of the present invention it is significant that radix-2 Booth encoding calculates multiplication with add and shift, or subtract and shift, or just a shift of the accumulator. When no add is necessary the controllers simply shift the data in the Z registers, decreasing the delay in calculating the multiplication and saving energy by not calculating a sum. Following completion of the calculation, the Z register provides the result of the multiplication which is passed to the right with an asynchronous handshake protocol. The latency and energy consumption of the multiplier is highly data dependent due to the optimizations but is significantly reduced by economizing considerations.

A large pipelined switch shown at 141 in FIG. 1 between the product block 140 and the $N_2$-point fast Fourier transform units at 150 routes data between various fast Fourier transform cells. By way of this pipelined switch data samples from each of the constant multiplied fast Fourier transform streams at 143, 144 and 145 are communicated to the $N_2$-point fast Fourier transform computation circuits indicated at 150. According to the arrangement, a second Fourier transformation of time displaced Fourier transform samples is accomplished and is output in a plurality of data streams $x_0(m_2), \ldots x_{N-1}(m_2)$ to an array of expanders 160. This second sampling and transforming of the sample data streams at 143, 144 145 has the effect of preparing the data sequences for the processing of an $N_2$-point fast Fourier transform in accordance with Eq. 13. Each $N_1$-point fast Fourier transform therefore provides one data point to each of the $N_2$-point fast Fourier transform units, the first row 143 providing the first sample, second row at 144 for the second sample and so on. One data point must be forwarded in each row and column every 640 ns, but $N_2$ (16) samples must be forwarded concurrently. This can be implemented very efficiently with no need for arbitration. Each row in the switch 141 has an $N_2$-bit wide Johnson counter and each column 146 has an $N_1$-bit wide Johnson counter. A Johnson counter is a shift register that wraps back to itself where only a single bit is asserted. Each shift in the column 146 the bit will move down the counter, and when shifted from the last position the bit will move to the first. This creates a one-hot encoding for each row and each column. A transfer of data from row i to column j of switch 141 is enabled when the bits from the two Johnson counters in that cell are ANDed together. The transmission proceeds when the row is enabled and a transfer request arrives from the product blocks at 140. Only a single cell in any row or column can have both the bits from the Johnson counters asserted at any given time. These counters can be used to correctly sequence transfers across the switch. On reset, the counters set their topmost or leftmost bit. The switch at each point is a traditional crossbar multiplexor. This crossbar is the largest shared structure of this fast Fourier transform implementation, and hence is one of the most power-hungry parts of the entire circuit rivaling the energy requirements of the multipliers. Due to the very low speed requirement on this circuit, the signals use precharge logic to eliminate short-circuit current. The excessive time permits rise and fall times of the circuits to be slow allowing capacitance to be reduced on this structure as well, allowing a relatively power efficient implementation for this shared structure.

Figure 10:
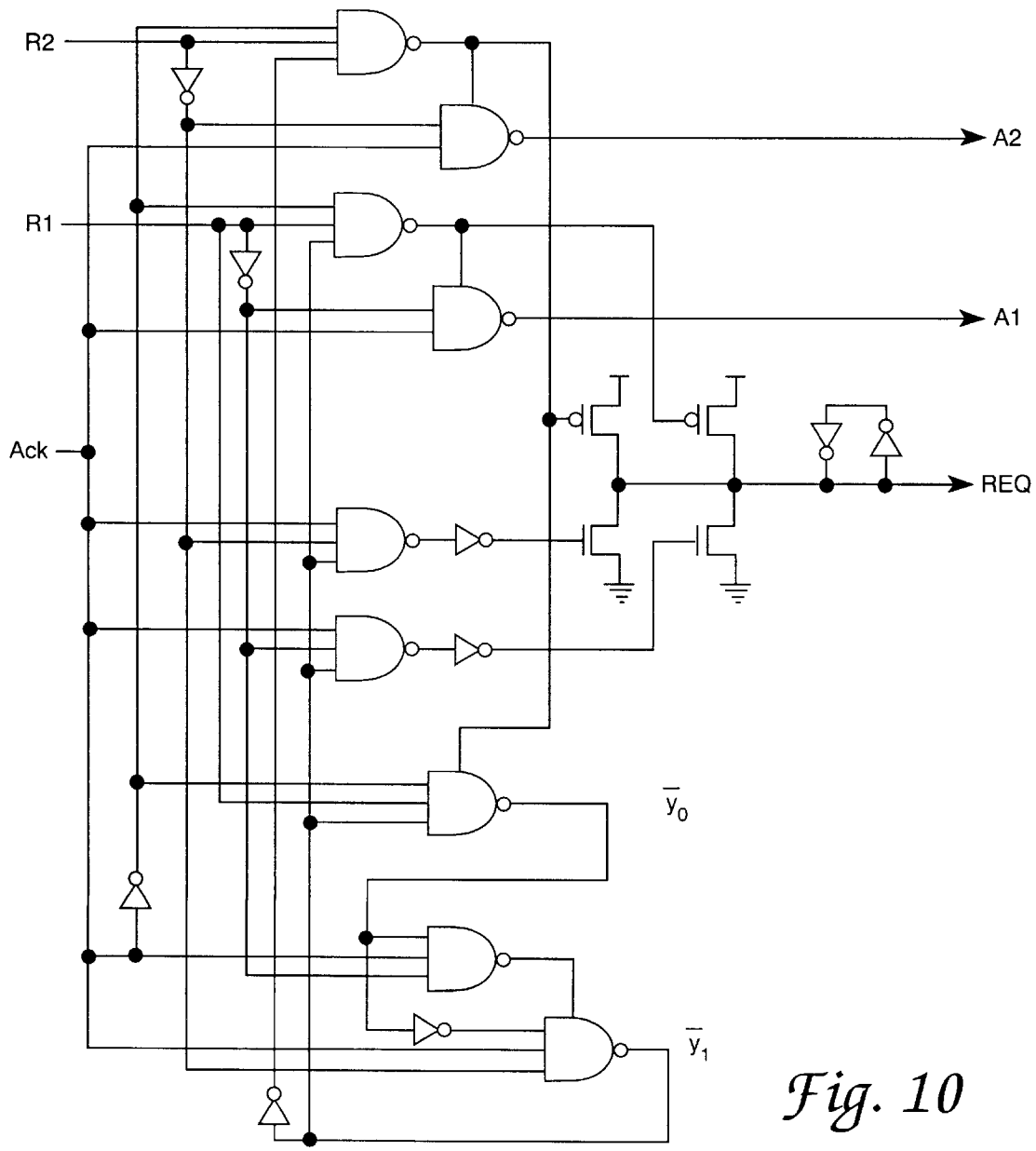
FIG. 10 shows a 2:1 expander arrangement.

Expanders, shown as an up arrow in the block diagram of FIG. 1 at 160, recombine the parallel result streams in an error-free manner into a single result stream at the same frequency as the input. More generally, expanders, also known as upsamplers, are a commonly used component of multirate signal processing that increases the sampling rate of the input signal. Letting L be a positive integer and x(n) be an input signal, an L-fold expander applied to an input signal x(n) inserts L−1 zeros between adjacent samples of the input signal. For a sampled signal x(n), the output of the expander is given by y(n)=x(n/L) if n is a multiple of L, otherwise the output is zero. Such an expander is represented in FIG. 10. The expander design is very much like the inverse of the decimator cell. The expander is more complex because it can receive inputs out of order. The expander can be implemented as a 2:1 expander, with input ports A and B, and output port C. The behavior is that input A is placed on port C, then value B is passed to port C, and this repeats. Due to the asynchronous nature of the pipelines and delays, it is entirely possible that the value on port B can arrive before the value on port A. The control for this cell requires that the data on port B wait until data on A has arrived and been transmitted before the value on B can be forwarded. These 2:1 expanders are interconnected in a logarithmic tree to form the entire expander function in FIG. 1.

The data samples input to both the fast Fourier transform blocks 120 and 150 as well as the multiplication constants at 130 are all fractions of unity and normalization of the results output from the expander are therefore required. Normalization of the results to retain the same number of bits as in the input signal is therefore required to achieve accurate results and prevent overflow. Two options exist for normalizing values. The first option fixes the decimal point for all calculations. This requires no additional hardware for normalization but significantly reduces the accuracy of the results due to round off error. Each add can result in a number that is larger than the two input values. Worst case, the number can be doubled resulting in a shift of the decimal point one place in a binary representation. The results can only be decreased following a multiply because the constant is unity or a fraction thereof. For this analysis, if the constant is unity we have the worst-case condition since the value of the number is not reduced. Eight additions are made on each sample passed from the input decimators to the output expanders. (Two additions per 4-point fast Fourier transform, of which there are four 4-point fast Fourier transform calculations and two multiplications required to generate each result sample.) An implementation eliminating normalization would therefore require the decimal point to be placed eight bits to the right, requiring an eight-bit sign extension of all samples fed to the fast Fourier transform. For implementations using a small word-size, such as 16-bit words, the numerical error would be too great. Therefore, this approach is only valid for implementations using large word sizes, such as 32-bit values for the real and imaginary roots.

The second implementation possible for normalizing values requires a normalization circuit before every fast Fourier transform and Product block. The amount of numerical error for this method can be traded off with the complexity of the normalization algorithm and accuracy of the sampling. Minimal normalization hardware can be created using the above analysis to arrive at a variance of eight bits in the decimal place location. Thus, a normalization implementation allowing shifts of up to eight bits is sufficient at each cell. Further accuracy, if necessary, could result in moving the decimal point farther for the fractional constants of the multiplier requiring additional shift capability for normalization. The placement of the decimal point must be passed as additional bits with each word.

While the apparatus and method described herein constitutes a preferred embodiment of the invention, it is to be understood that the invention is not limited to this precise form of apparatus or method and that changes may be made therein without departing from the scope of the invention which is defined in the appended claims.

We claim:

1. A low energy consumption electronic circuit-based method of performing an N-point fast Fourier transformation comprising the steps of:

electronically sampling discrete data points consecutively in time from an input signal waveform and assigning each of said data points successively to $N_2$ number of parallel data tracks, each successive data track receiving a delayed sample of input signal data relative to the previous track, said assigning being repeated to said data tracks until all input signal data points are assigned;

said sampling step achieving a first data sequence downward frequency scaling of said input signal waveform data points by a factor of $1/N_2$, and providing $N_2$ number of reduced frequency second data sequences containing every $N_2$th data point from said input signal waveform;

electronically performing an $N_1$-point first fast Fourier transform operation on each of said $N_2$ number of reduced frequency second data sequences, numbers $N_1$, $N_2$ and N being related by the expression $N_1N_2=N$;

shifting phase of output of said performing step through a multiplication operation;

output from said shifting step defining $N_1$ rows of Fourier transformed first data sequences and correspondingly located data points from each of said $N_1$ rows of Fourier transformed first data sequences defining $N_2$ number of columns defining $N_2$ number of Fourier transformed second data sequences;

electronically accomplishing an $N_2$-point second fast Fourier transformation on each column of said second data sequences defined by said $N_2$ number of columns;

electronically recombining $N_1$ number of second Fourier transformed second data sequences from said accomplishing step into a single output data sequence representing an output data sequence of an N-point fast Fourier transformation operation on said input signal waveform, said recombining also achieving an upward frequency scaling of each $N_1$ number of output data sequences from said accomplishing step by a factor of $N_1$, a resulting frequency being also equivalent to the frequency of said discrete input sequence waveform; and controlling said sampling, performing, shifting, accomplishing and recombining steps by a minimal number of state transitions of a finite state machine, said N-point fast Fourier transform being achieved with lower electronic computational circuitry energy dissipation than required in performing a direct N-point fast Fourier transformation on said input sequence waveform.

2. The low energy consumption electronic circuit method of performing an N-point fast Fourier transformation of claim 1 wherein said performing and accomplishing steps are reiterative in nature and performance of said $N_1$ and $N_2$-point fast Fourier transformations includes plural repetitions of said steps.

3. The low energy consumption electronic circuit method of performing an N-point fast Fourier transform of claim 1, further including the step of normalizing said single output data sequence representing an output data sequence of an N-point fast Fourier transform.

4. The low energy consumption method of performing an N-point fast Fourier transform of claim 3, said normalizing comprising the step of providing a normalization circuit before every fast Fourier transform block and every Product block.

5. A low energy consumption N-point fast Fourier transform computational device comprising:

electronic circuit means for sampling discrete data points consecutively in time from an input signal waveform and assigning each of said data points successively to $N_2$ number of parallel data tracks, each successive data track receiving a delayed sample of input signal data relative to the previous track, said assigning being repeated to said data tracks until all input signal data points are assigned;

said electronic circuit means for sampling discrete data points achieving a first data sequence downward frequency scaling of said input signal waveform data points by a factor of $1/N_2$, and providing $N_2$ number of reduced frequency second data sequences containing every $N_2$th data point from said input signal waveform;

electronic circuit means for performing an $N_1$-point first fast Fourier transform operation on each of said $N_2$ number of reduced frequency second data sequences, numbers $N_1$, $N_2$ and N being related by the expression $N_1N_2=N$;

means for shifting phase of output of said performing step through a multiplication operation;

output from said means for shifting phase defining $N_1$ rows of Fourier transformed first data sequences and correspondingly located data points from each of said $N_1$ rows of Fourier transformed first data sequences defining $N_2$ number of columns defining $N_2$ number of Fourier transformed second data sequences;

electronic circuit means for accomplishing an $N_2$-point second fast Fourier transformation on each column of said second data sequences defined by said $N_2$ number of columns;

electronic circuit means for recombining $N_1$ number of second Fourier transformed second data sequences from said accomplishing step into a single output data sequence representing an output data sequence of an N-point fast Fourier transformation operation on said discrete input signal waveform, said recombining also achieving an upward frequency scaling of each $N_1$ number of output data sequences from said accomplishing step by a factor of $N_1$, a resulting frequency being also equivalent to the frequency of said discrete input sequence waveform, and being achieved with lower electronic computational circuitry energy dissipation than required in performing a direct N-point fast Fourier transformation on said input sequence waveform; and means for controlling said electronic circuit means for sampling, electronic circuit means for performing, means for shifting phase, electronic circuit means for accomplishing and said electronic circuit means for combining by a minimal number of state transitions of a finite state machine, said N-point fast Fourier transform being achieved with lower electronic computational circuitry energy dissipation than required in performing a direct N-point fast Fourier transformation on said input sequence waveform.

6. The low energy consumption N-point fast Fourier transform computational device of claim 5, said sampling means comprising a plurality of decimators wherein a first decimator samples a first data point, a second decimator samples a second data point and continuing until the last $N_2$ decimator samples a data point whereupon the cycle begins again and said first decimator samples a second data point until all data points are sampled.

7. The low energy consumption N-point fast Fourier transform computational device of claim 5, said means for expanding comprising a plurality of expanders for recombining parallel sequence streams in an error-free manner back into a single stream at the same frequency as the input signal waveform.

8. The low energy consumption N-point fast Fourier transform computational device of claim 5, further comprising normalizing means.

9. The low energy consumption N-point fast Fourier transform computational device of claim 5 wherein said means for performing and means for accomplishing are reiterative, each of the $N_1$ and $N_2$-point fast Fourier transforms being performable by plural repetition of elements of claim 5.

10. A low energy consuming electronic circuit-based device for performing an N-point fast Fourier transform on an input data sequence comprising:

a plurality of 1:2 decimator cells for separating said discrete input data sequence into $N_2$ number of sequences containing every $N_2$th data point from said input data sequence;

a first plurality of complex number storage registers connected to respective output terminals of said 1:2 decimator cells for receiving and storing data therefrom;

first arithmetic logic means connected to said complex number storage registers for asynchronously calculating an $N_1$-point fast Fourier transform of each sequence output from each of said decimator cells, said numeric values $N_1$, $N_2$ and N being related by the mathematical relationship of $N_1=N/N_2$;

means for shifting phase of output of said first arithmetic logic means by a multiplier operation;

a second plurality of complex number storage registers for receiving and storing data received word by word from an array of $N_1$ data columns of said crossbar switch;

second arithmetic logic means connected with said second plurality of complex number storage registers for performing an $N_2$-point second fast Fourier transform on each data word input thereto;

crossbar switch means connected to said means for shifting phase for routing output therefrom to a second plurality of complex valued registers, output from said multiplier means comprising $N_2$ number of data rows each containing $N_1$ point fast Fourier transformed data sequences, a first row providing via said crossbar switch means a first data point and a second row providing a second data point in an array of $N_1$ data column;

2:1 data expander cell means connected to said second arithmetic logic means and receiving $N_1$ data words therefrom for recombining into a single data sequence, having a same frequency as that of said discrete input data sequence, words of second fast Fourier transformed data received therefrom; and asynchronous finite state controller means for coordinating data communication.

11. The low energy consuming electronic circuit-based device of claim 10, wherein said plurality of decimator cells are connected in a logarithmic architecture tree to assist in sequencing data from said decimator cells.

12. The low energy consuming device of claim 10, wherein said complex valued registers are world-wide registers.

13. The low energy consuming device of claim 10, wherein said arithmetic logic means comprises adding and subtracting circuit elements.

14. The low energy consuming device of claim 13, wherein said adding circuit elements comprise dual rail carry propagate adder circuit elements.

15. The low energy consuming device of claim 10, said plurality of 1:2 decimator cells, said plurality of complex valued registers, said arithmetic logic means and said multiplying means are connected by circuit wires, circuit wires which also store data values by capacitor action until a time determined by said asynchronous finite state controller means.

16. The low energy consuming electronic circuit-based device of claim 10, wherein said plurality of expander cells are connected in a logarithmic tree architecture enabling sequencing of data from said decimator cells.

17. The low energy consuming electronic circuit-based device of claim 10, wherein each row includes an $N_2$-bit wide Johnson counter and each column includes an $N_1$ bit wide Johnson counter which communicates the bit down the counter each shift and each shift having a single bit of data circulation therein, and said data bit when shifted from a last counter bit position to a first bit position creating a one-hot encoding for each row and each column for correctly sequence data transfers across said crossbar switch.

18. The low energy consuming device of claim 10, wherein said multiplier means comprises:

a multiplier for performing arithmetic calculations;

a first asynchronous finite state machine for requesting data from output of said arithmetic logic means said data comprising multipliers and multiplicands, and said first asynchronous finite state machine issuing an acknowledgment signal upon receipt of said data;

means for retrieving multipliers whose value is equal to zero, one and negative one from said first asynchronous finite state machine;

a second asynchronous finite state machine for controlling input data with a zero valued multiplier and propagating a value of zero therefrom;

a third asynchronous finite state machine for controlling input data with a negative-one valued multiplier and propagating the complement of the corresponding multiplicand therefrom;

a fourth asynchronous finite state machine for controlling input data with a multiplier with a value of one propagating the corresponding multiplicand therefrom;

wherein said multiplier performs arithmetic calculations on all data having a multiplicand other than zero, negative-one, and one;

a register for accumulating output of said multiplier and said second, third and fourth asynchronous finite state machines, said register adding upon receiving outputs from said multiplier; and means for providing accumulated data to said second plurality of complex valued registers.

* * * * *